United States Patent

[11] 3,633,112

[72] Inventor Dean T. Anderson
Marion, Iowa
[21] Appl. No. 76,116
[22] Filed Sept. 28, 1970
[45] Patented Jan. 4, 1972
[73] Assignee Collins Radio Company
Dallas, Tex.

[54] DIGITAL AUDIO SQUELCH
10 Claims, 4 Drawing Figs.

[52] U.S. Cl. .......... 325/478
[51] Int. Cl. .......... H04b 1/16
[50] Field of Search .......... 179/1 P, 1 D, 1 VL; 325/348, 378

[56] References Cited
UNITED STATES PATENTS
3,437,937 4/1969 Warfield .......... 325/478
3,564,419 2/1971 Yackish .......... 325/348

*Primary Examiner*—Robert L. Richardson
*Attorneys*—Warren H. Kintzinger and Robert J. Crawford

ABSTRACT: A digital squelch circuit taking the received audio signal and generating a digital train of pulses representing zero crossing characteristics of the received signal with, for example, if the signal is greater than zero, a logic level one being generated and if it is less than zero, a logic level zero being generated. The processed signal is then repeatedly sampled for predetermined time intervals via a counter (or a charging sample and hold circuit) to determine the time measured apparent zero crossing frequency. The time measured apparent frequency is then used repeatedly to gate and ungate the squelch.

Figure 1:
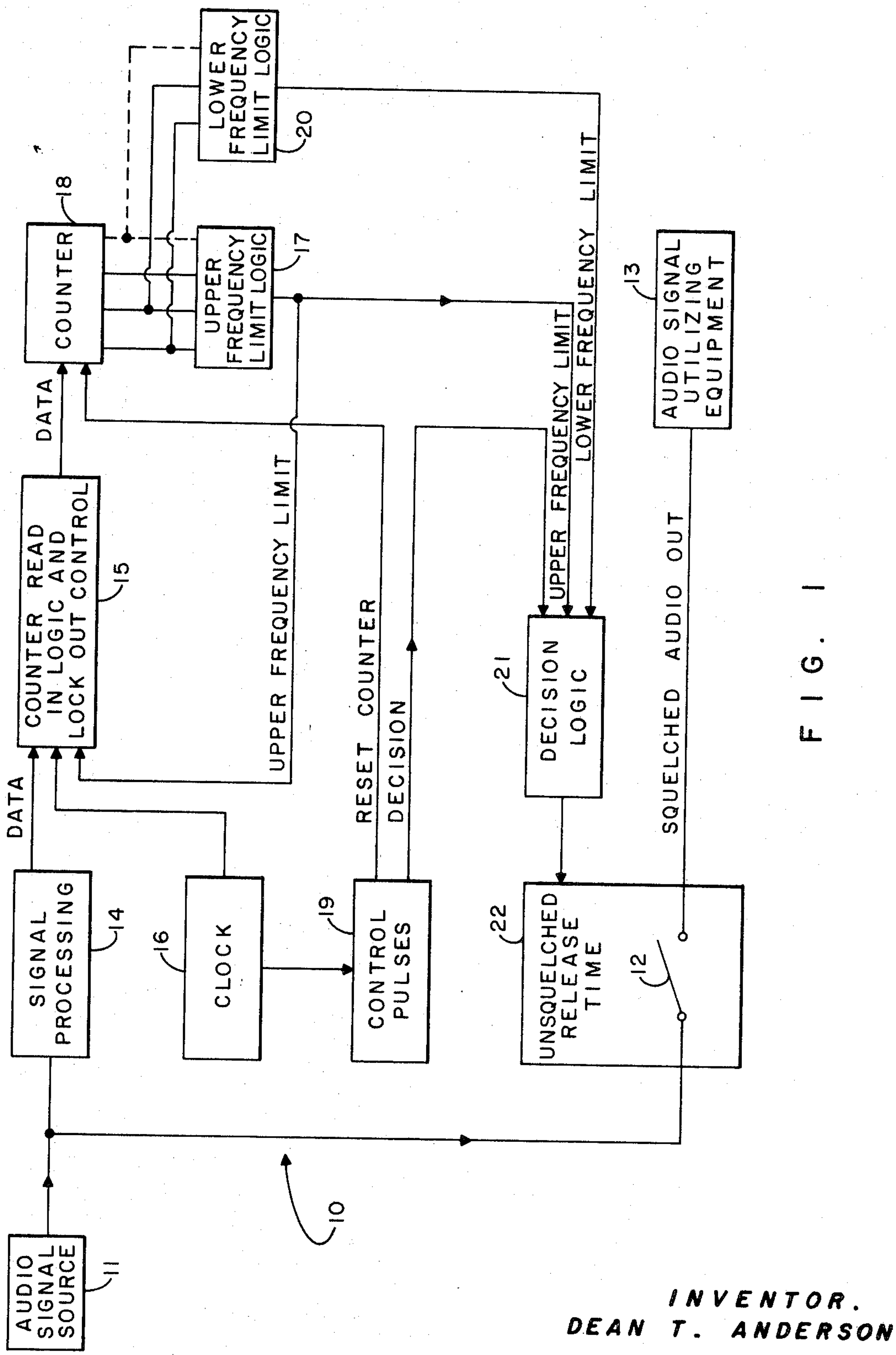

INVENTOR.
DEAN T. ANDERSON
BY Warren H. Kintzinger
ATTORNEY

INVENTOR.
DEAN T. ANDERSON
BY Warren H. Kintzinger
ATTORNEY

INVENTOR.
DEAN T. ANDERSON
BY Warren H. Kintzinger
ATTORNEY

DIGITAL AUDIO SQUELCH

This invention relates in general to squelch systems used with audio circuits, such as with the detected audio of a radio receiver, and in particular, to audio squelch systems designed for operation through comparison of voice zero crossing frequency to the average noise crossing frequency with a receiver being muted when no audio signal is present.

With most single sideband radio receivers, as well as many other radio receivers, squelch circuitry is included for eliminating operator fatigue caused by having to listen to background noise with the receiver being muted through the squelch function when no audio signal is present. With one squelch approach that has found wide usage, a radio receiver's automatic gain control (AGC) is sampled to open the audio channel when the received signal level reaches a set level. However, with this squelch approach, random noise pulses will in many instances cause false triggering thereby making it impossible at times to distinguish between voice signal and noise. Another squelch circuit approach with various radios looks for the presence of an AM carrier, with however this approach being limited in that it works only with carrier modulated signals with no capability at all with single sideband since there is no fixed carrier frequency with SSB to sense. One reasonably successful single sideband (SSB) squelch approach uses the difference between a white noise spectrum and a voice spectrum to decide if voice is present in the received channel. With this squelch approach, the audio signal is divided into two channels with, for example, a band pass filter centered at 500 Hz. in the first channel and a band pass filter centered at 2,500 Hz. in the second channel. The two resulting filter-passed signals are then rectified, low-pass filtered at 25 Hz., and linearly added together to generate a trigger signal. If white noise is present, the two signals tend to cancel one another since each generates an equal, but opposite, DC level at the output. If, however, a voice signal is present, most of its energy is centered around 500 Hz. and a net positive signal is generated at the summing point out of the two filters. This resulting summed signal can then be used to close a relay that completes the circuit to the speaker letting the operator hear the audio being conveyed. With this system, once the relay is closed, it is generally delayed from opening up and muting the speaker for approximately 1.5 seconds. This is with approximately 1.5 seconds being an appropriate time since when the release time is much shorter than 1.5 seconds the squelch system has been found to close between words.

There are a number of other factors that have proven to be trouble sources with this type of squelch. With voice normally low frequencies predominate so the 500 Hz. channel detector has a higher voltage applied to it than the 2,500 Hz. channel detector. Further, certain words that start with F, V, S, or Z have their energy centered at higher frequencies and they generally fall out of and above the 500 Hz. filter channel. Still another limitation with such a squelch approach is that it has a small dynamic operating range and requires a reasonably constant signal input level for proper operation with any reduction below the designed level lowering the positive trigger signal and desensitizing the circuit. This is a particularly severe limitation since the circuit should be capable of operation from a little above received ambient noise level to the maximum signal the receiver can tolerate. The relative significance of such a disadvantageous operating feature becomes even more pointed in considering that, even with an extremely fat automatic gain control, a receiver signal may vary 15 db. False triggering is another significant problem with such a system in that when noise is present and the detectors tend to cancel each other, there is a very pronounced divergence from perfect correlation between the detected levels of the 500 Hz. and the 2,500 Hz. filter channels. While their average detected levels may tend to cancel, there are some moments in time when the instantaneous levels add in phase to effectively generate a large positive trigger voltage. One approach in an effort to counter this has been to minimize the effect by Towering the low-pass filter cutoff frequency; however, the frequency cannot be lowered much below 25 Hz. since it would seriously affect the attack time, that is, the time between the originating voice signal and circuit operation.

It is, therefore, a principal object of this invention to provide a digital audio squelch approach divorced from or at least minimizing the various limitations set forth and with this accomplished via a digital squelch circuit taking the received audio signal and generating a digital train of pulses representing the zero-crossing characteristics of the audio signal. This is accomplished, for example, with the resulting processed signal then being sampled with a counter or charging sample and hold circuit for a time to determine the time-measured apparent zero crossing frequency. This time-measured apparent frequency is then used to gate and ungate the squelch circuit of the radio system.

Another object with such a squelch system is to minimize false squelch triggering.

A further object with such a digital squelch system is to achieve a good compromise between squelch attack time and white noise statistics so as to minimize word dropout and undesired muting where intervals between words are greater than average. With white noise present, the time-measured apparent frequency is centered about the center of the audio band and its standard deviation from the center frequency, $F_o$, is a function of audio bandwidth, center frequency, and sample time. However, for normal single sideband (SSB) receivers with fixed audio channels, the sample time is the only variable that needs to be fixed. A good compromise between squelch attack time and white noise statistics is $T_o$ equal to approximately 40 milliseconds and with this sample time the standard deviation for white noise apparent frequency is ± 104 Hz. from $F_o$ (typically $F_o$ is equal to 1,675 Hz).

Features of the invention useful in accomplishing the above objects include, in a digital audio squelch system, a squelch system that effectively recognizes that if voice is present that the predominant low-frequency energy shifts the noise density from $F_o$ to a center frequency close to 500 to 600 Hz. When this shift takes place, the time-measured apparent frequency goes down and a decision circuit is activated enabling the voice gate. It is a squelch circuit continually sampling and making decisions by repetitive cycles of approximately 40 milliseconds duration, always with each cycle looking for the presence of low-frequency voice formats. If at any time the circuit sees a time-measured apparent frequency lower than the decision frequency, $F_2$, the audio switch between the radio and the speaker will close and voice will be heard. Once the squelch is triggered, the audio channel is held open for approximately 1.5 seconds. With strictly white noise on the other hand, since white noise has a time-measured apparent frequency higher than the decision frequency $F_2$ the decision circuit will never trigger. It is of interest that if digital techniques are employed, a BCD input to a counter circuit can set the value of $F_2$, and if analogue operational amplifier techniques are used, bias setting in an operational amplifier circuit can control $F_2$ in a similar way.

A specific embodiment representing what is presently regarded as the best mode of carrying out the invention is illustrated in the accompanying drawings.

Figure 2:
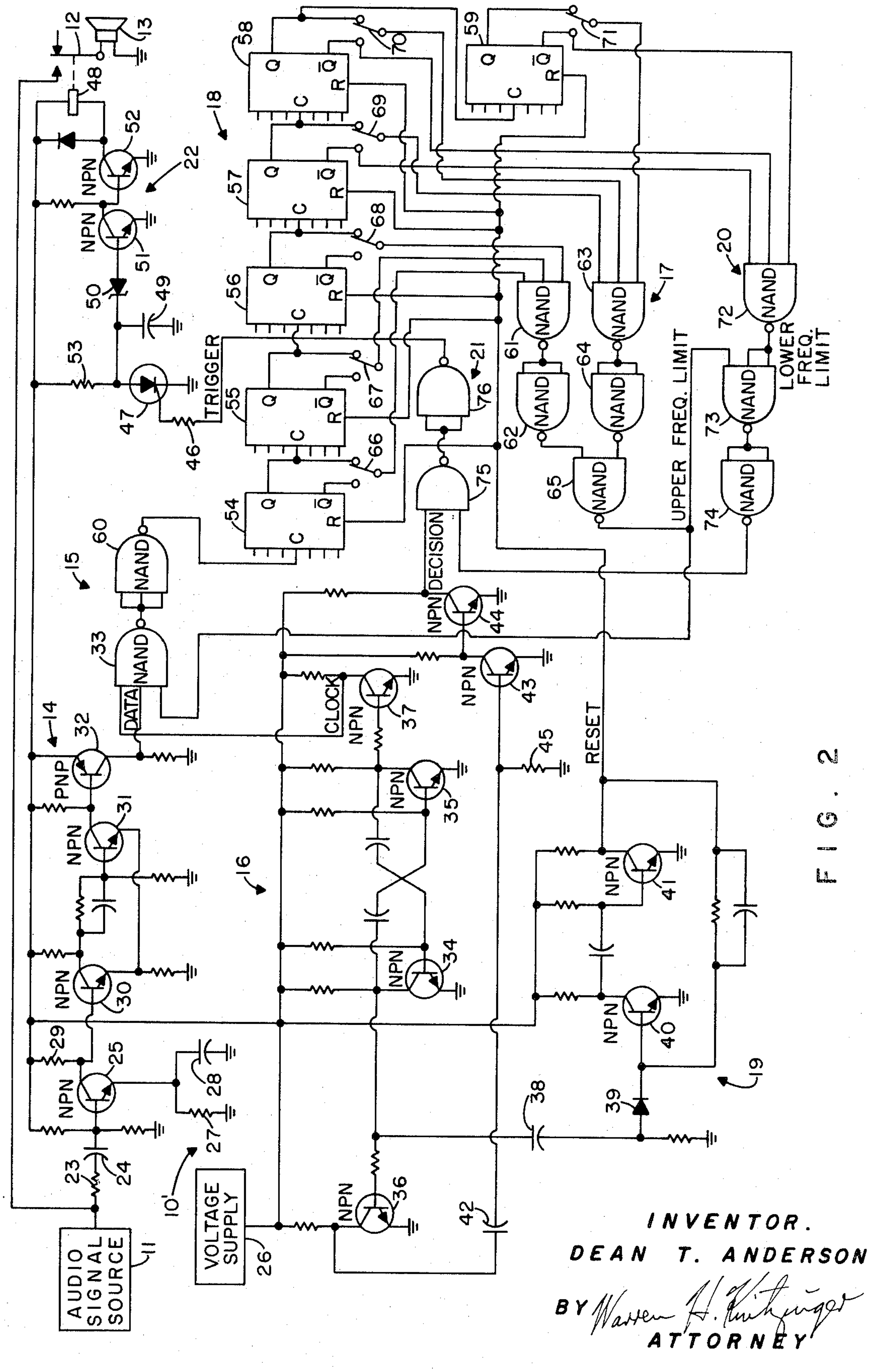
Figures 3, 4:
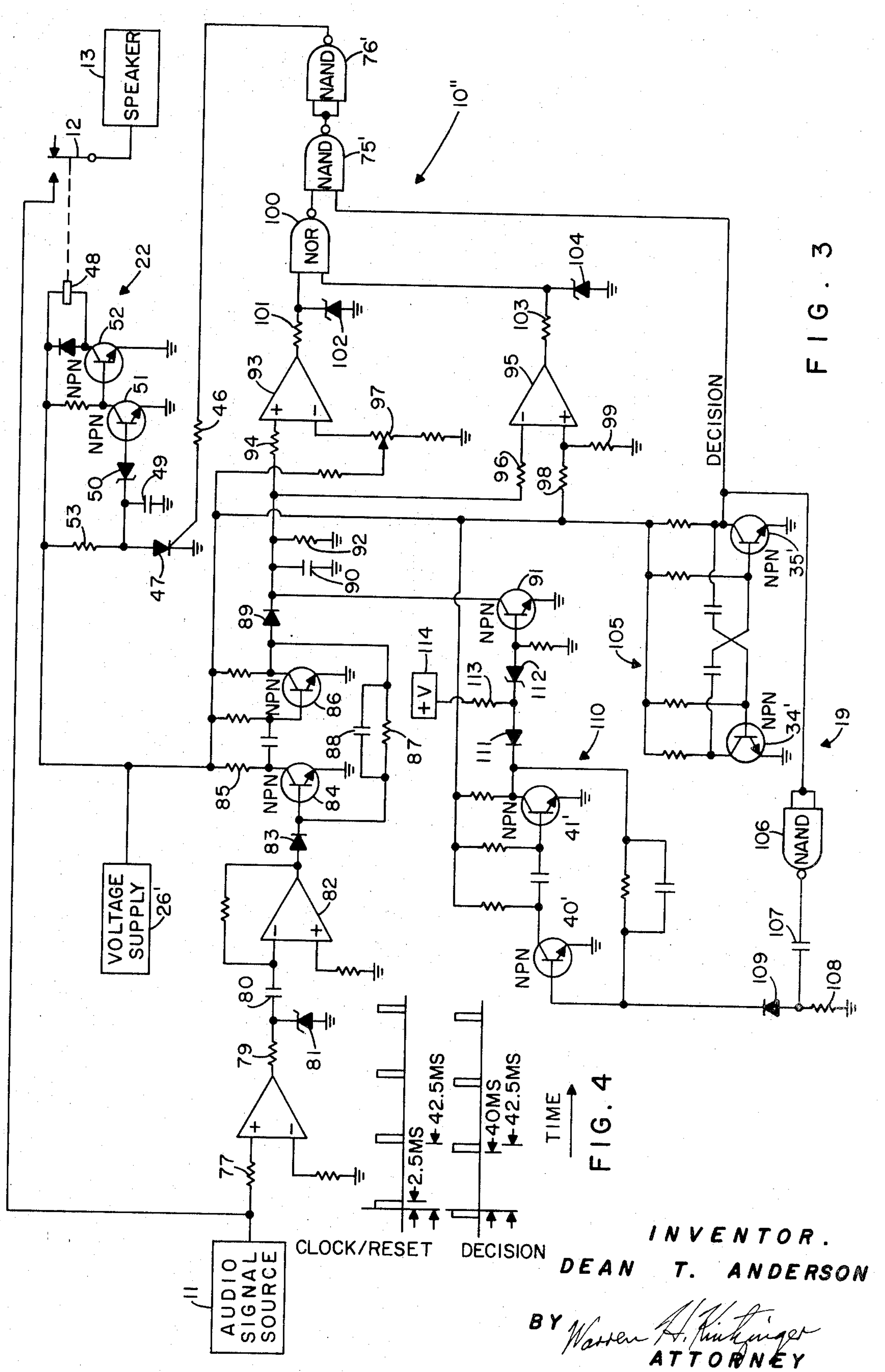

In the drawings:

FIG. 1 represents a general block schematic diagram of applicant's digital counter voice detector noise squelch system;

FIG. 2, a detailed schematic of such a digital voice detector noise squelch system;

FIG. 3, a schematic of a digital sample and hold voice detector noise squelch circuit employing a recycling period signal pulse charge and operational amplifier analogue system; and FIG. 4, a timing waveform pulse layout of clock/reset (F) and decision (E) versus time for the embodiment of FIG. 3.

Referring to the drawings:

The digital audio squelch system 10 of FIG. 1 is shown to have a signal path extended from an audio signal source 11 through a normally open squelch switch 12 to audio signal-utilizing equipment 13. The signal output of audio signal source 11 is also connected to signal-processing circuit 14 that provides a data output to counter read in logic and lockout control circuit 15 also receiving a clock-timing signal from clock 16 and an upper frequency limit input from upper frequency limit logic circuit 17. The counter read in logic and lockout control circuit 15 provides a data output as an input to counter circuit 18 also receiving a counter reset input from control pulse circuit 19 that is time controlled by an input from clock 16. Output connections of counter circuit 18 are provided to lower frequency limit logic circuit 20 in addition to those extending to logic circuit 17. The upper frequency limit output of logic circuit 17 and the lower frequency limit output of lower frequency limit logic circuit 20 along with a decision output of control pulse circuit 19 are applied as inputs to decision logic circuit 21. The output of decision logic circuit under predetermined operational signal states provides a trigger-initiating quick squelch switch-closing control via unsquelched release time circuit 22 that has a predetermined squelch switch 12 lag release to open squelch state time.

The digital technique employed with the squelch system 10 of FIG. 1 takes into consideration limitations encountered with many other audio detector and squelch systems. For example, since the signal is processed through high-gain amplifiers generating the pulse train, the signal input could vary 40 db. and the pulse train would not be affected. The net result is a larger dynamic range and better low signal to noise squelch operation than that attained with other squelch circuits. Furthermore, typical values of $F_2$, depending upon ambient noise levels, go between 800 Hz. and 1,200 Hz. with this meaning that the decision bandwidth, for a normal SSB (single sideband) receiver, is between 300 to 800 Hz. and 300 to 1,200 Hz. compared to just 300 Hz. for the two passband squelch. Since the bandwidth is larger, the circuit will generally trigger on voice many more times than other circuits will per spoken word, and words with energy above approximately 500 to 600 Hz. will, many times, trip the squelch where other squelch circuit skip the word altogether. Also, since a reasonable standard deviation of 104 Hz. results from a 40 millisecond sample time, the squelch does not exhibit anywhere near the false triggering of other squelch circuits.

The squelch system using digital voice detection repeatedly samples the time-measured apparent zero-crossing frequency of the signal plus noise and decides whether noise or a voice plus noise signal is present. If the detector in the system indicates that voice is present, the channel between the source and the listener is closed, and if noise alone is indicated, the audio channel is left open, squelching the system. The detector in the system can be considered as being an extremely small synchronous computer with the function of continuously monitoring the apparent zero-crossing frequency of the radio channel under control of a master clock particularly in the embodiment of FIGS. 1 and 2.

Signal processing through circuit 14 is necessary to convert the noise or noise-plus-voice signal to a form that can be counted and routed properly. This is accomplished by generating a square wave that will stay at either a positive constant or zero level as long as the channel signal stays above or below the zero voltage level, respectively. When noise alone is in the channel, the time measured apparent zero-crossing frequency will be centered around the center of the receiver's bandwidth. Furthermore, when voiced speech of sufficient magnitude is present in the channel, the apparent frequency will be centered around the voice format generated for that particular sound. Since in a normal SSB radio receiver, the apparent frequency of white noise is centered around 1,675 Hz. and voiced formats are normally from 300 to 1,000 Hz., the detector is designed for any time it finds an apparent frequency in a selected voice format range.

After the signal is processed into square wave, it is routed into a logic circuit which will let the data be read into a counter for as long as the clock stays high. This read in time, 40 milliseconds, is the sample time for the apparent zero-crossing frequency. The counter counts in a binary sequence, and the outputs from the individual flip-flops are decoded by both an upper frequency and lower frequency logic network. When the counter has reached a certain count indicating that the frequency will be greater than or equal to a set frequency, a signal is sent to the counter read in logic block which locks out all further incoming data during what is left of the sample time. This lockout prevents the counter from recycling and thereby giving erroneous frequency indications. A lower frequency limit circuit will indicate whether or not the frequency at the end of the sample time is less than or equal to a set frequency. Both lower and upper frequency limit signals are fed into the decision logic block and the decision is made at the end of the sample time and initiated by a decision command, whether the frequency counted is between predetermined frequencies $f_1$ and $f_2$. Furthermore, both $f_1$ and $f_2$ will be picked such that it is highly improbable that a noise sample will fall into this range. If the decision is that the frequency is between $f_1$ and $f_2$, the decision logic will unsquelch the system for 1.5 seconds letting the listener hear what is said. The counter is then reset a little after the decision pulse and the count sequence cycles over and over continuously looking for an apparent zero-crossing frequency between $f_1$ and $f_2$. The frequencies between $f_1$ and $f_2$ were picked to include most of the voice format frequencies. If the circuit fires before the 1.5 seconds of delay is complete, the unsquelched release time is reset to the full 1.5 seconds again. Since the circuit has a relatively long release time, any unvoiced sounds that occur between voiced sounds will not be affected if they last less than 1.5 seconds.

The lower frequency limit, $f_1$, is set at 200 Hz. so any frequency count that would be 200 Hz. or less would not activate the circuit. This is a needed precaution to prevent 60 Hz. hum, if present, and radio quieting from causing false triggering. For example, during a strong transmission the receiver's AGC may reduce the radio's gain by 60 db. or more. Since the AGC circuitry has a built-in release time, typically between 0.1 and 1 seconds, the receiver's output will be very quiet when the transmission is complete because the channels can be as much as 60 db. low initially following signal removal. This will effectively remove any noise from the detector for a time equal to the release time, and the resulting count will be zero. The choice of 200 Hz. lower frequency limit will eliminate false triggering in this situation. The upper frequency limit may be preset with one hard-wired frequency or, it may be control set by a radio operator with such as a wafer switch with selected frequencies built into the control and with switches, associated with the flip-flops of the counter section 18 in FIG. 2, possibly switch sections of such a wafer switch.

Referring to FIG. 2 with the signal processor circuit 14 of the digital squelch system 10' a signal path connection is provided through resistor 23 and capacitor 24 to the base of NPN-transistor 25 acting as a high-gain amplifier. This is with transistor base connected to biasing circuitry interconnected between positive voltage supply 26 and ground, the emitter connected through resistor 27 and capacitor 28 in parallel to ground. The collector output of transistor 25 in addition to connection through resistor 29 to positive voltage supply 26 is directly connected to the base of NPN-transistor 30 of a Schmitt trigger circuit, also including NPN-transistor 31, to give the processor a desired low-level gain needed to achieve a high signal to threshold level. For example, the processor needs only 23 millivolts peak-to-peak signal to make the Schmitt trigger circuit switch. The Schmitt trigger collector output of transistor 31 is connected to the base of driver circuit PNP-transistor 32 having a collector output connection as an input to three input NAND-gate 33 of counter read in logic and lock out control circuit 15.

Clock 16 uses NPN-transistors 34 and 35 in a circuit environment giving a free-running multivibrator clock with an asymmetrical waveform and a total time period of substantially 45 milliseconds. This is with NPN-transistors 36 and 37 being used to isolate the clock 16 from the respective loads the clock is required to drive. Control pulses, initiated by clock coupled through capacitor 38 and diode 39, and generated by a one-shot multivibrator including NPN-transistors 40 and 41 in a one-shot multivibrator circuit such that a positive pulse width of substantially 43 milliseconds is provided therefrom. The collector output of NPN-transistor 36 is coupled through capacitor 42 to the base of NPN-transistor 43 of a high-gain pulse amplifier, also including NPN-transistor 44, developing control pulses having a positive pulse width of substantially 1.5 milliseconds. This is as determined by the charging circuit of capacitor 42 through resistor 45 connected between the base of transistor 43 and ground and any other impedance in the charging circuit.

A trigger signal transmitted through resistor 46 to the control electrode of (SCR) silicon controlled rectifier 47 is used to turn on relay 48 and close switch 12 to complete the audio signal path to the speaker 13 for the unsquelch function. When a positive pulse is applied to the control electrode of SCR 48 capacitor 49 is quickly discharged to ground through SCR 47. This acts through zener diode 50 to turn off NPN-transistor 51 and thereby turn on NPN-transistor 52 and therewith turn on of relay 48. When the relatively short interval positive pulse is removed from the control gate electrode of SCR 47 capacitor 49 is charged through resistor 53 by the positive voltage supply 26. The values of resistor 53 and capacitor 49 are so chosen consistent with the positive voltage value of voltage supply 26 that it takes 1.5 seconds for the charge level on capacitor 49 to reach the 1.5 volt threshold of zener diode 50. When the zener diode 50 threshold level is reached NPN-transistor 51 is turned on and transistor 52 off to thereby deenergize relay 48 and activating squelch by breaking the audio to speaker 13 signal path.

Six JK flip-flops 54, 55, 56, 57, 58, and 59 are serially interconnected to form a six-stage binary counter 18 with a control pulse reset counter line connected to the reset terminal of all six flip-flops for controlled simultaneous reset of all the six flip-flops to their ground or zero state. Data is fed from the collector output of PNP-transistor 32 as one of the inputs to three input NAND-gate 33 also receiving a 40 millisecond clock signal from the collector of clock circuit NPN transistor 37, and also an upper frequency limit input from upper frequency limit logic circuit 17. The output of NAND-gate 33 is applied to all three inputs of NAND-gate 60 as the remainder of the counter read in logic and lockout control circuit 15 with the output thereof connected as an input to the C terminal of the first flip-flop 54 of the binary counter chain 18. With the clock and the upper frequency limit fed as inputs to NAND-gate 33 data will only be passed to the counter circuit 18 as long as the clock and upper frequency limit inputs are both in the high or one state. The upper frequency limit circuit is a six input NAND circuit using NAND-gate 61, 62, 63, 64, and 65, with NAND-gate 61 connected for receiving inputs from three switches 66, 67, and 68 and with NAND-gate 63 connected for receiving inputs from three switches 69, 70, and 71. The six switches are connected for being switched between Q and $\overline{Q}$ output terminals of respective individual JK flip-flops 54 through 59. Thus, it follows that the output of the upper frequency limit circuit will stay in the one state if during the 40 millisecond clock on period the resulting counter count is below a set upper frequency limit set by acting on the Q or $\overline{Q}$ states of the six counter flip-flops as determined by setting of switches 66 through 71.

The low frequency limit circuit 20 includes three input NAND-gate 72 with the inputs thereof individually connected to the $\overline{Q}$ outputs of flip-flops 57, 58, and 59. This is to give a ground or zero output for the first seven counts and, therefore, the lower frequency limit being approximately 200 Hz. Both the lower and upper frequency circuit outputs are combined together via NAND-gates 73 and 74 successively to give an output that is a one between the lower and upper frequencies. At the end of the sample time when the decision pulse is generated out the collector of NPN-transistor 44 as an input to gate 75 the other input thereto will have the result of the count in the form of the upper and lower frequency combination output of NAND-gate 74. The gate 75 is output coupled to two inputs of gate 76 in the decision logic circuit 21 also including NAND-gates 73 and 74. If the resultant count gives a one, the decision pulse will let a 1.5 millisecond pulse be transmitted to the SCR gate 47 to unsquelch the circuit for 1.5 seconds. It is of interest to note, that, with this embodiment, all logic necessary to decode the counter's output is done using multiple NAND gates.

If noise is present, the count will usually lock out the data, indicating that the frequency would have resulted in a higher count than the upper frequency limit and the circuit will stay squelched. This is so since at decision time there is a zero state at the other input to gate 75 with noise present and no trigger pulse is generated to fire SCR 47. However, if voice is present, the decision is made that the frequency counted is lower than the upper frequency limit and the circuit fires to the unsquelched state. The counter is reset 3 milliseconds after the decision pulse is initiated enabling the circuit to recycle 2 milliseconds later when the clock gate starts the feeding of data to the counter again. The circuit continuously samples and makes decisions every 45 milliseconds always looking for the presence of audio frequency voice formats. Various portions of the embodiment of FIG. 2 could be varied since, for example, various functions may be combined through use of integrated circuits with, as a further example, the six stage counter being replaced with two four-stage-counter-integrated circuits. Integrated circuit variations could be provided in the clock, Schmitt trigger, and pulse circuits.

With the embodiment of FIG. 3 a digital sample and hold voice detector noise squelch circuit 10'' is presented employing a recycling period signal pulse charge and operational amplifier analogue system. There is much in common between this analogue detector squelch system approach and the digital voice detector noise squelch system embodiment of FIG. 2. The big difference, however, is that the analogue approach does not use a counter to calculate the time measured apparent zero-crossing frequency. With the analogue system the zero-crossing frequency is measured by gating a fixed pulse, every time the signal crosses the zero axis, into a sample and hold circuit. At the end of the sample time the value of the voltage on a fixed capacitor is looked at and if it is between two limits (corresponding to $f_1$ and $f_2$), the circuit trigger activates the SCR 47 of unsquelched release time circuit 22, that is the same as employed with the embodiment of FIG. 2, to activate the squelch relay 48 and close switch 12 to complete the audio signal path to the speaker 13 for the unsquelched function.

With the embodiment of FIG. 3 signal passed through resistor 77 is processed through high-gain operational amplifier 78 that operates to generate a square wave output with resistor 79 and capacitor 80 in the signal output path therefrom and with the junction of resistor 79 and capacitor 80 connected through zener diode 81 to ground. The square wave signal is then differentiated by operational amplifier 82 to develop a resulting series of positive pulses out of the cathode of diode 83, one for each time the noise or noise plus signal from source 11 switches from positive to negative. These positive pulses are passed to the base of NPN-transistor 84 of one-shot multivibrator 85 also including NPN-transistor 86, connection from the base of transistor 84 through resistor 87 and capacitor 88, in parallel, to the collector output of transistor 86, and appropriate voltage bias circuitry connected to positive voltage supply 26'. Positive pulses of predetermined duration (0.2 milliseconds for example) out of one-shot multivibrator 85 and passed through diode 89 is fed primarily into capacitor 90 with the voltage on capacitor 90 increasing by a small amount with each pulse during duty cycle times when capacitor 90 is not being discharged to ground through NPN-transistor 91. Since the time constant of capacitor 90 and the parallel combination of resistor 92, the input resistance to operational amplifier 93 with input resistor 94, and the input resistance to operational amplifier 95 with input resistor 96 is large compared to 40 milliseconds, the voltage on capacitor 90 will continue to increase as long as pulses are fed through diode 89 and NPN-transistor 91 is in the off state. An adjustable voltage reference connection for operational amplifier 93 is provided with resistor voltage divider between positive voltage supply 26′ and ground with variable resistor 97 whereby the limit frequency, $f_2$, of the operational amplifier 93 can be varied from 200 Hz. to 1,600 Hz. The voltage reference connection for operational amplifier 95 is from the common junction of resistors 98 and 99 serially connected between positive voltage supply 26′ and ground.

The operational amplifiers 93 and 95 along with NAND-gate 100 determine the high and low time-measured apparent frequency that is needed for the squelch system to trigger relay 48 thereby closing switch 12 to the unsquelched state. This is with the output of operational amplifier 93 connected through resistor 101 to the cathode of zener diode 102 and through diode 102 to ground, and as a first input to NAND-gate 100. Further, the output of operational amplifier 95 is connected through resistor 103 to the cathode of zener diode 104 and through diode 104 to ground, and as the second input to NAND-gate 100.

The fixed offset voltage on the positive input of operational amplifier 95 is a voltage equivalent of seven pulses in 40 milliseconds as seen by the charged voltage level on capacitor 90. Therefore, if the apparent frequency is less than 200 Hz. operational amplifier 95 output will be a logic level one, and if the apparent frequency is higher than 200 Hz. the amplifier 95 output will be a logic level zero. The values of resistors 98 and 99 along with the positive voltage value of voltage supply 26′, with operational amplifier 95 circuitry, determines the lower limit, $f_1$, setting approximately for 200 Hz. Operational amplifier 93 is subject to operation in much the same way with its limit frequency, $f_2$, settable from 200 Hz. to 1,600 Hz. by setting resistor 97 with, however, the input phase reversed from amplifier 95 such that a signal below a $f_2$ equivalent will produce a logic zero out and a signal above $f_2$ will produce a logic level one out.

Thus, both operational amplifiers 93 and 95 must be in the logic level zero output state for a decision pulse, fed to one of the two inputs of NAND-gate 75′ (the other input is the output from NAND-gate 100) to result in a trigger pulse out of NAND-gate 75′ firing SCR 47 and unsquelching the audio line to speaker 13. Thus, analogue sample and hold techniques are used to determine if a sample frequency is between $f_1$ and $f_2$, and if it is, voice is assumed and the squelch will trigger relay 48.

The transistor asymmetric multivibrator 105 with NPN-transistors 34′ and 35′ performs a timing function in generating a 2.5 millisecond decision pulse every 40 milliseconds. This decision pulse, in addition to being applied as an input to NAND-gate 75′, is applied to the two input terminals of inverter NAND-gate 106 with an output coupled through capacitor 107 to the junction of resistor 108 and the anode of diode 109. The signal pulse appearing at the cathode of diode 109 resulting from each decision pulse at the end of each decision pulse initiates the 2.5 millisecond one-shot multivibrator clock/reset pulse. Reference to the decision and clock/reset vs. time waveforms of FIG. 4 should be helpful in understanding the timing of the pulses and their sequential relationship. One-shot multivibrator circuit 110 including NPN-transistors 40′ and 41′ has an output connection through diode 111 and zener diode 112 to the base of reset NPN-transistor 91. Please note that items identified with primed numbers are the same or similar to the corresponding items in the embodiment of FIG. 2 and use of the same numbers indicates that the items are the same. The junction of the anode of diode 111 and the cathode of zener diode 112 is connected through resistor 113 to a positive voltage supply 114 shown as an independent supply although this could be common to positive voltage supply 26′. The clock/reset line signal after each 2.5 milliseconds turn on of transistor 91 turns off the transistor 91 for 40 milliseconds that is actually the repeated 40 millisecond charging periods for capacitor 90 to charge up to the value determining the 40 millisecond apparent frequency. In each periodic timing cycle at the end of 37.5 milliseconds the decision pulse will let a logic level one out of NAND-gate 100 trigger the circuit in the next 2.5 milliseconds. If voice is present the circuit will trigger, and if noise is present the circuit will stay squelched. Then again after the decision pulse is completed the clock reset pulse will be initiated and discharge any voltage on capacitor 90 to ground. The cycle will continue over and over again every 42.5 milliseconds always looking for the presence of low-frequency voice formats.

Whereas this invention is herein illustrated and described with respect to two specific embodiments hereof, it should be realized that various changes may be made without departing from the essential contributions to the art made by the teachings hereof.

I claim:

1. In a digital audio squelch system: audio signal source connective input means; audio circuit path means extended from said input means for connection to audio signal utilizing equipment; a squelch action controlled switch in said audio signal input means; signal-processing means connected to said audio signal input means of the type-sensing signal zero crossing in a received signal and generating a digital train of pulses as an output; gating means connected to receive said digital train of pulses output from said signal processing means; timing means including a clock signal source and having a signal connection to said gating means; signal pulse count responsive means controlled by said timing means for repeated uniform short interval count cycles; upper frequency limit responsive means, and lower frequency limit responsive means with both connected to said signal pulse count responsive means; gating logic means connected to the outputs of both said upper and lower frequency limit responsive means; short interval decision timing signal means connected as an enable input to said gating logic means; and an unsquelch circuit controlling said switch connected to receive activating trigger outputs of said gating logic means.

2. The digital audio squelch system of claim 1, wherein said timing means also includes reset time signal generating means connected to cycle-terminating means for the repeated short interval count cycles.

3. The digital audio squelch system of claim 2, wherein said signal pulse count responsive means is a binary counter circuit.

4. The digital audio squelch system of claim 3, wherein said binary counter circuit includes a series connected chain of flip-flops.

5. The digital audio squelch system of claim 4, wherein said reset time signal generating means is connected to reset terminals of individual flip-flops of said chain of flip-flops.

6. The digital audio squelch system of claim 2, wherein said signal pulse count responsive means is a charging sample and hold circuit.

7. The digital audio squelch system of claim 6, wherein said charging sample and hold circuit includes a charging capacitor that charges to higher and higher voltage levels with each signal pulse applied to the capacitor through each signal pulse count cycle.

8. The digital audio squelch system of claim 7, wherein said cycle-terminating means includes a transistor completing a circuit discharge path for the capacitor when fired to conduction.

9. The digital audio squelch system of claim 2 wherein said unsquelch circuit controlling said switch includes a signal-activating device; and a time interval activated state hold device.

10. The digital audio squelch system of claim 9, wherein said time interval activated state hold device is a capacitor; and said signal-activating device is a solid state device connected for completing a discharge path about said capacitor when trigger signal activated.

* * * * *

UNITED STATES PATENT OFFICE

CERTIFICATE OF CORRECTION

Patent No. 3,633,112 Dated January 4, 1972

Inventor(s) Dean T. Anderson

It is certified that error appears in the above-identified patent and that said Letters Patent are hereby corrected as shown below:

Column 1, line 74, delete "Towering" and substitute therefor --lowering--; column 2, line 9, after "with" insert --, if the signal is greater than zero, a logic level ONE being generated and if it is less than zero, a logic level ZERO being generated with--; column 3, line 68, after "for" insert --unsquelch--; column 5, line 5, after "the" insert --clock--; column 6, line 57, after "plus" insert --voice--; column 7, line 11, delete "NAND" and substitute therefor --NOR--; line 17, delete "NAND" and substitute therefor --NOR--; line 21, delete "NAND" and substitute therefor --NOR--; column 8, line 4, delete "NAND" and substitute therefor --NOR--; line 21, after "audio" insert --circuit path means;--; line 22, delete "signal input means;".

Signed and sealed this 6th day of June 1972.

(SEAL)
Attest:

EDWARD M.FLETCHER,JR.
Attesting Officer

ROBERT GOTTSCHALK
Commissioner of Patents

ORM PO-1050 (10-69)

USCOMM-DC 60376-P69
☆ U.S. GOVERNMENT PRINTING OFFICE : 1969 O—366-334